(12) United States Patent
Bruce et al.

(10) Patent No.: US 7,736,108 B1
(45) Date of Patent: Jun. 15, 2010

(54) STRUCTURAL BLIND ANCHOR BOLT

(75) Inventors: Ryan W. Bruce, Scotts Valley, CA (US); William E. Warner, Soquel, CA (US); Michael D. Hanson, Scotts Valley, CA (US)

(73) Assignee: Roofscreen Mfg., Santa Cruz, CA (US)

( * ) Notice: Subject to any disclaimer, the term of this patent is extended or adjusted under 35 U.S.C. 154(b) by 412 days.

(21) Appl. No.: 11/851,174

(22) Filed: Sep. 6, 2007

(51) Int. Cl.
*F16B 13/10* (2006.01)
(52) U.S. Cl. ...................... 411/346; 411/340
(58) Field of Classification Search .......... 411/340–346
See application file for complete search history.

(56) References Cited

U.S. PATENT DOCUMENTS

| 450,127 | A | * | 4/1891 | Wrigley | 411/340 |
|---|---|---|---|---|---|
| 991,427 | A | * | 5/1911 | Clements | 411/340 |
| 1,061,480 | A | * | 5/1913 | Kennedy | 411/340 |
| 4,043,245 | A | * | 8/1977 | Kaplan | 411/346 |
| 4,120,231 | A | * | 10/1978 | Neumayer | 411/340 |
| 4,286,497 | A | * | 9/1981 | Shamah | 411/342 |
| 4,294,156 | A | * | 10/1981 | McSherry et al. | 411/345 |
| 4,298,298 | A | | 11/1981 | Pontone | |
| 4,439,079 | A | * | 3/1984 | Losada | 411/345 |
| 4,557,631 | A | | 12/1985 | Donan, Jr. et al. | |
| 5,203,647 | A | | 4/1993 | Blackwell | |
| 5,236,293 | A | * | 8/1993 | McSherry et al. | 411/344 |
| 5,876,169 | A | | 3/1999 | Wrigley | |
| 5,904,462 | A | | 5/1999 | Gonzalez | |
| 5,980,176 | A | | 11/1999 | Akashi | |
| 6,161,999 | A | * | 12/2000 | Kaye et al. | 411/344 |
| 6,287,065 | B1 | | 9/2001 | Berlin | |
| 6,386,809 | B2 | | 5/2002 | Ikuta | |
| 6,808,333 | B2 | | 10/2004 | Friesen et al. | |
| 6,821,069 | B2 | * | 11/2004 | Ikuta | 411/344 |

* cited by examiner

*Primary Examiner*—Flemming Saether
(74) *Attorney, Agent, or Firm*—Schneck & Schneck; Thomas Schneck; David M. Schneck

(57) ABSTRACT

An anchor assembly having a nut which is pivotably connected to a sleeve which is slideable along a rod housing. The nut is pivotable to and from a position in vertical alignment with rod housing and a position perpendicular to the rod housing in which a threaded nut opening is in vertical alignment with a opening of the rod housing. A flange is disposed above the rod housing and a stop washer is disposed above the flange, the rod insertable within both the flange and washer. The threaded rod is insertable through the rod opening of the rod housing and threadable within the threaded opening of the nut when the nut is in a position perpendicular to the rod housing. When the nut of the anchor assembly is positioned into vertical alignment with the rod housing, the assembly can fit into a narrow hole. Once the nut clears the opening, the nut moves into the position perpendicular to the rod housing so that the rod may be threaded through the nut opening. The rod is threaded through the nut opening until the washer contacts the flange at which point the nut is drawn up to a bottom side of a substrate surface by way of the slideable sleeve.

9 Claims, 6 Drawing Sheets

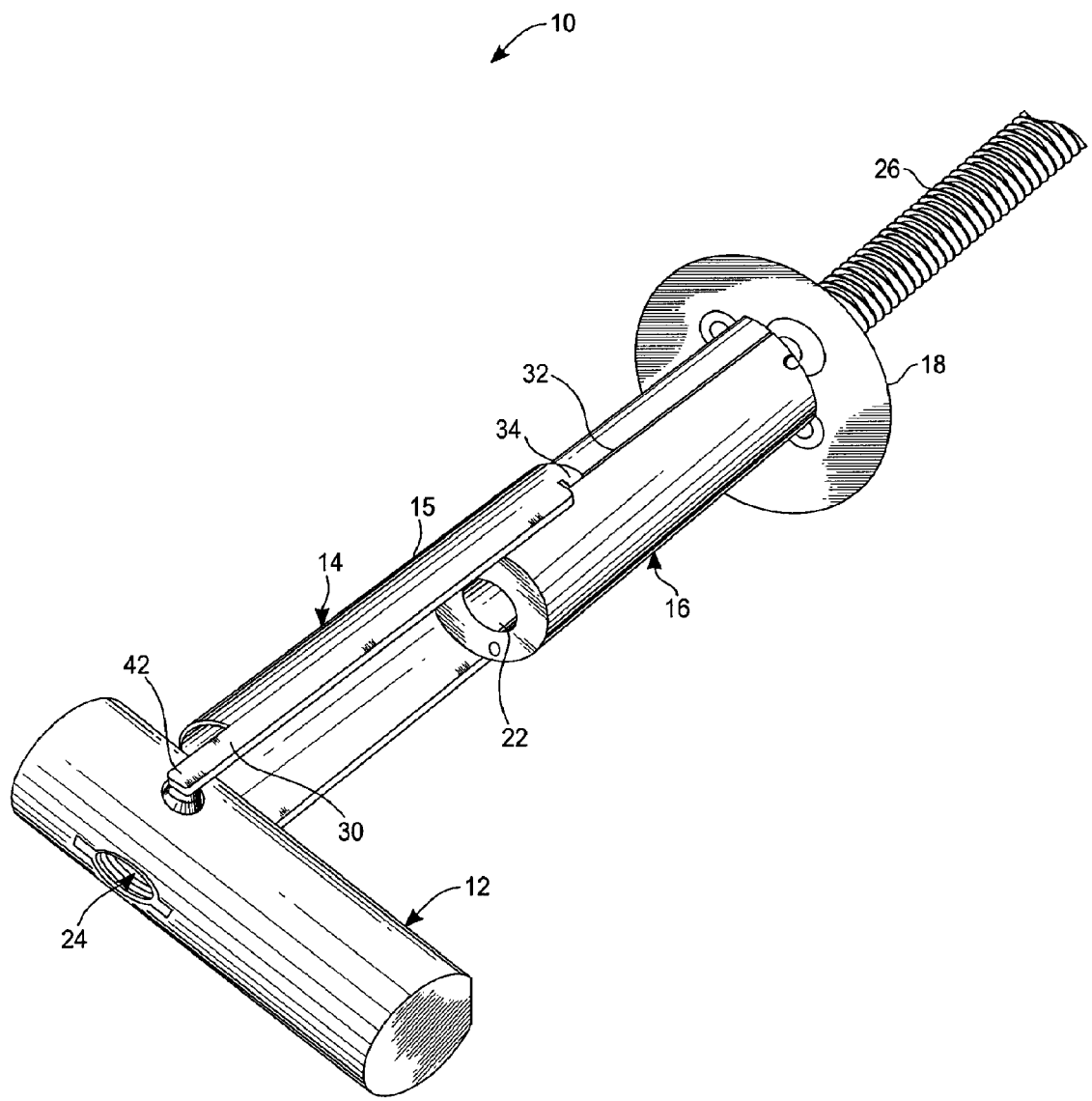
Fig._1

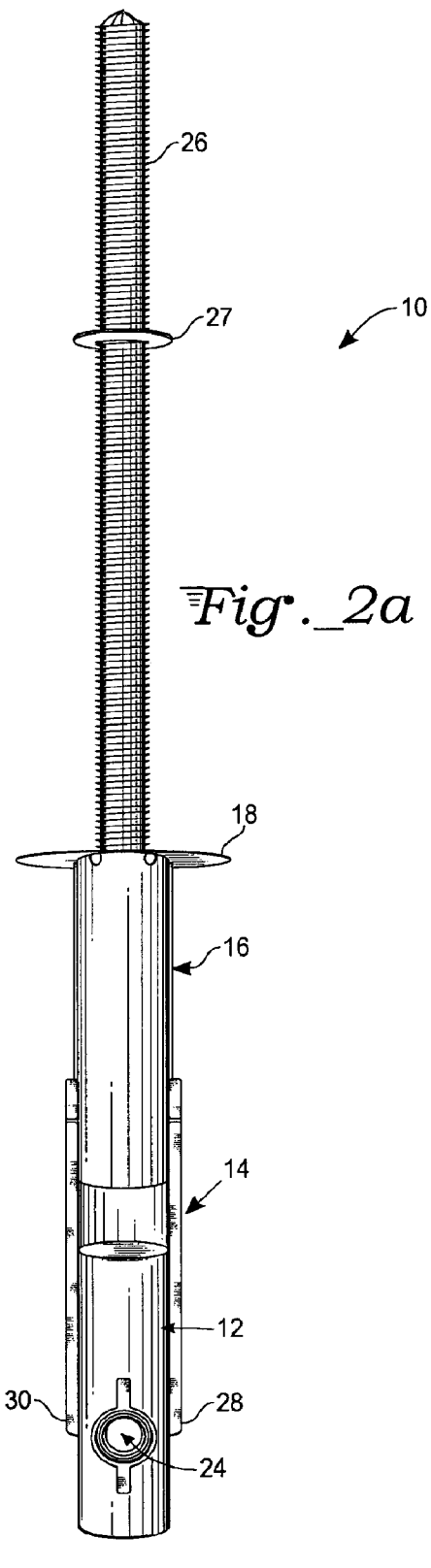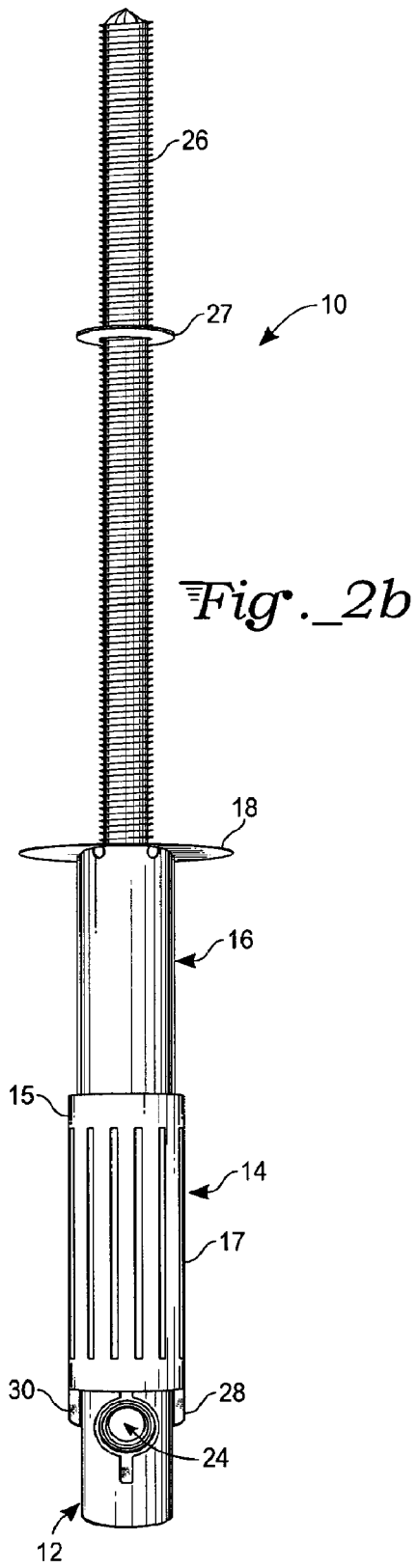

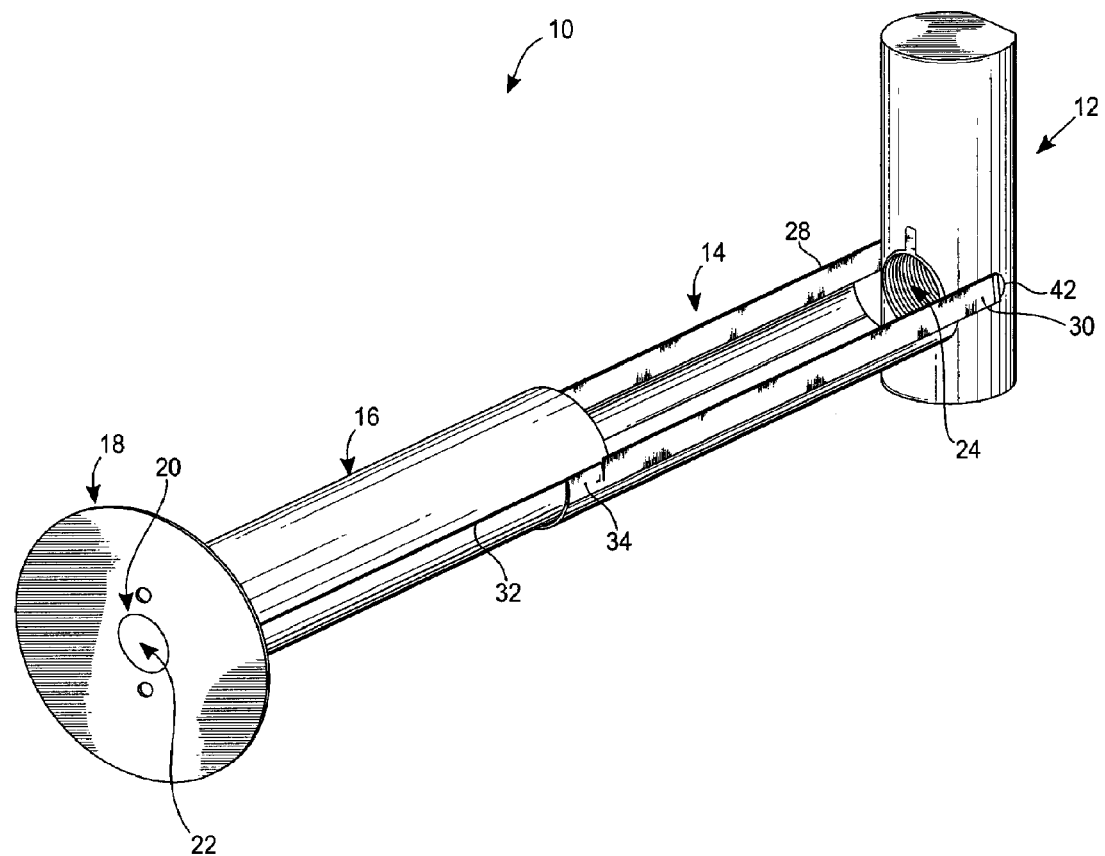
Fig._3

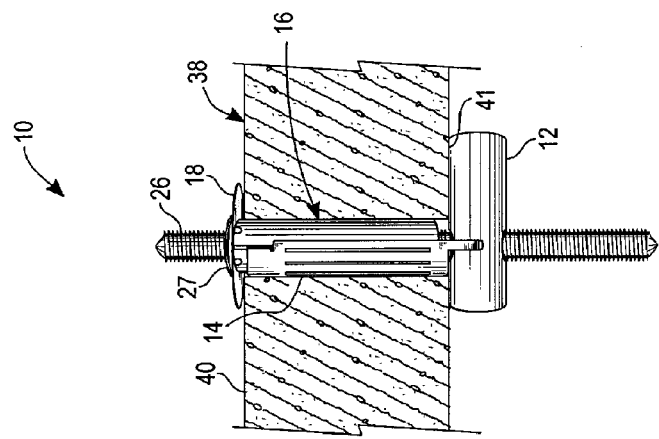
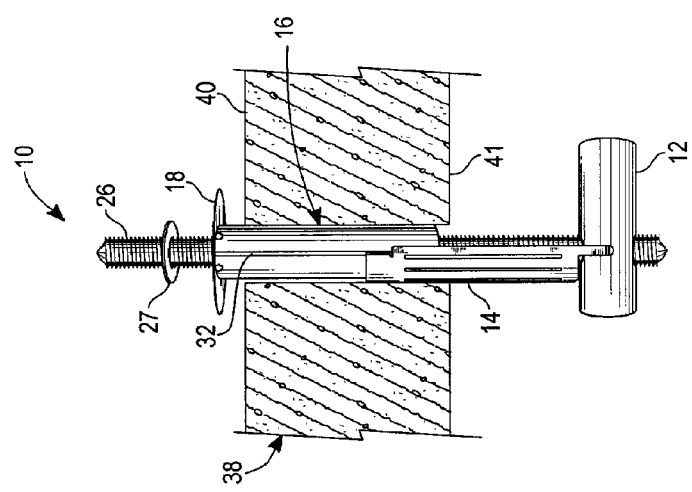
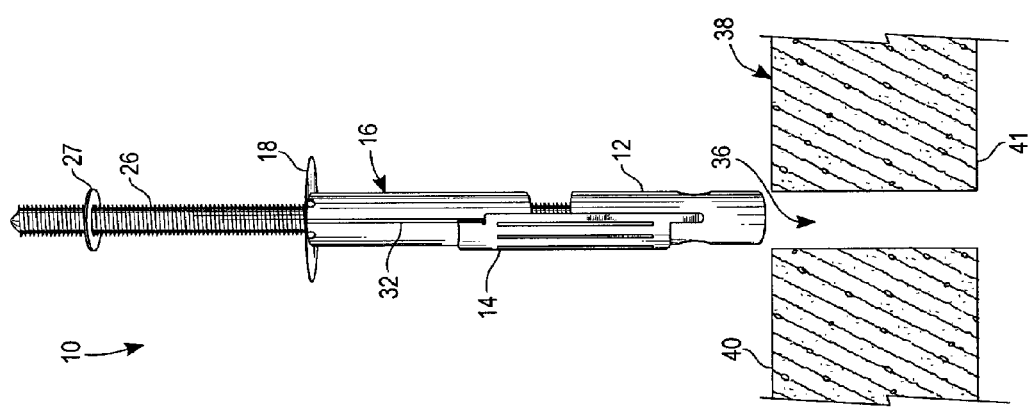

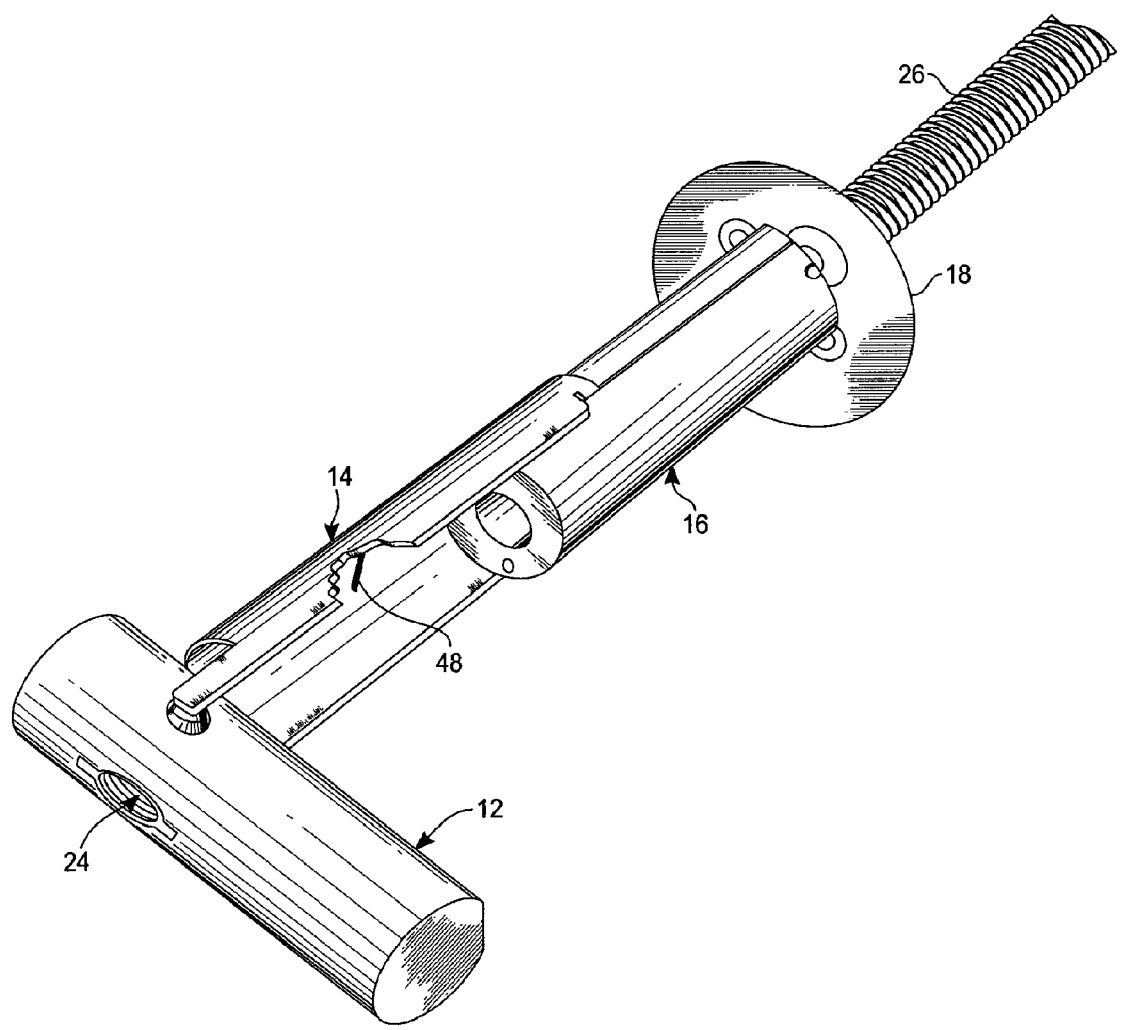
Fig._6

STRUCTURAL BLIND ANCHOR BOLT

TECHNICAL FIELD

The invention relates, in general, to structural anchors used to anchor various items to a surface, and, in particular, to structural anchors used to anchor various items to a surface which is, for example, accessible only from one side or for which access from an additional side is difficult.

BACKGROUND OF THE INVENTION

"Blind-hole" anchoring applications involve anchoring items, such as various types of equipment or apparatus, to a surface from which anchoring access is generally only available from one side of substrate. Examples of substrates include concrete, a hollow wall, an I-beam, or wood. Difficulties exist in blind-hole anchoring in that some of the prior art mechanisms require a large aperture through which to pass when securing an item to the surface. In some cases, making a large enough aperture is impractical.

Further, in some prior art anchoring mechanisms it is difficult to align the bolt with the nut of the anchor assembly.

It is an object of the present invention to provide an anchor assembly that may be used in blind-hole anchoring applications.

It is a further object of the present invention to provide a new and improved anchor assembly that may be used in any desired application.

SUMMARY OF THE INVENTION

These and other objects have been achieved by an anchor assembly having a nut which is pivotable from a first position in vertical alignment with a rod housing to second a position perpendicular to the rod housing in which a threaded nut opening is in vertical alignment with an opening of the rod housing. The anchor assembly is typically inserted through an opening in its first position and then, after insertion, the nut moves to the second position so that the threaded nut opening is in alignment with the rod in the housing. In this way, the anchor assembly can be inserted down a relatively small opening. Also, this blind nut anchoring device is further stabilized in the opening because the rod housing nearly fills the opening in which the anchor was dropped through. Further, the anchor assembly may be easily used in item anchoring applications in which there is access to a surface from only one side or for which access from an additional side is difficult.

The anchor assembly further includes a sleeve slideable along the rod housing and to which the nut is pivotably connected. In one embodiment, the sleeve includes a pair of arms, a point of each at which the nut pivots, disposed on either side of the nut. The sleeve is slideable up and down the rod housing changing the length of the anchor assembly so that the assembly can be used with substrates of varying lengths.

The assembly also includes a flange disposed above the rod housing and a stop washer within which the threaded rod is inserted and attached. The flange and washer are, for example, annular and each include an opening in vertical alignment with the rod opening.

In use, the anchor assembly is inserted within a substrate opening. During insertion through the substrate opening, the nut is disposed in a position in vertical alignment with the rod housing so that the assembly may be inserted down a relatively small opening. Once the opening is cleared, the nut snaps into the position perpendicular to the rod housing in which the nut opening is in vertical alignment with the rod housing opening. The threaded rod is inserted through the flange and housing, and threaded through the threaded nut opening. As the threaded rod is tightened, the nut and the sleeve are drawn upwardly. Typically, the sleeve is drawn up to a point where the nut makes contact with a bottom side of a substrate surface. Various types of equipment or apparatus may be anchored with the anchor assembly of the present invention.

BRIEF DESCRIPTION OF THE DRAWINGS

FIG. 1 is a perspective view of the anchor assembly of the present invention in a first position.

FIG. 2a is a perspective view of the anchor assembly of the present invention in a second position.

FIG. 2b is a perspective rear view of the anchor assembly of FIG. 2a.

FIG. 3 is another perspective view of the anchor assembly of FIGS. 1 and 2.

FIG. 4a is a cross-sectional view of a substrate to which an item is to be secured and a front view of the anchor assembly of the present invention in the first position.

FIG. 4b is a front view of the anchor assembly of the present invention inserted within an opening of the substrate of FIG. 4a and in the second position with the rod inserted within the nut.

FIG. 4c is a front view of the anchor assembly of the present invention inserted within the substrate of FIG. 4a and in the second position with the rod threaded further down than in FIG. 4b.

FIG. 6 is a perspective view of a spring loaded nut of the present invention.

DETAILED DESCRIPTION OF THE INVENTION

Figure 5:
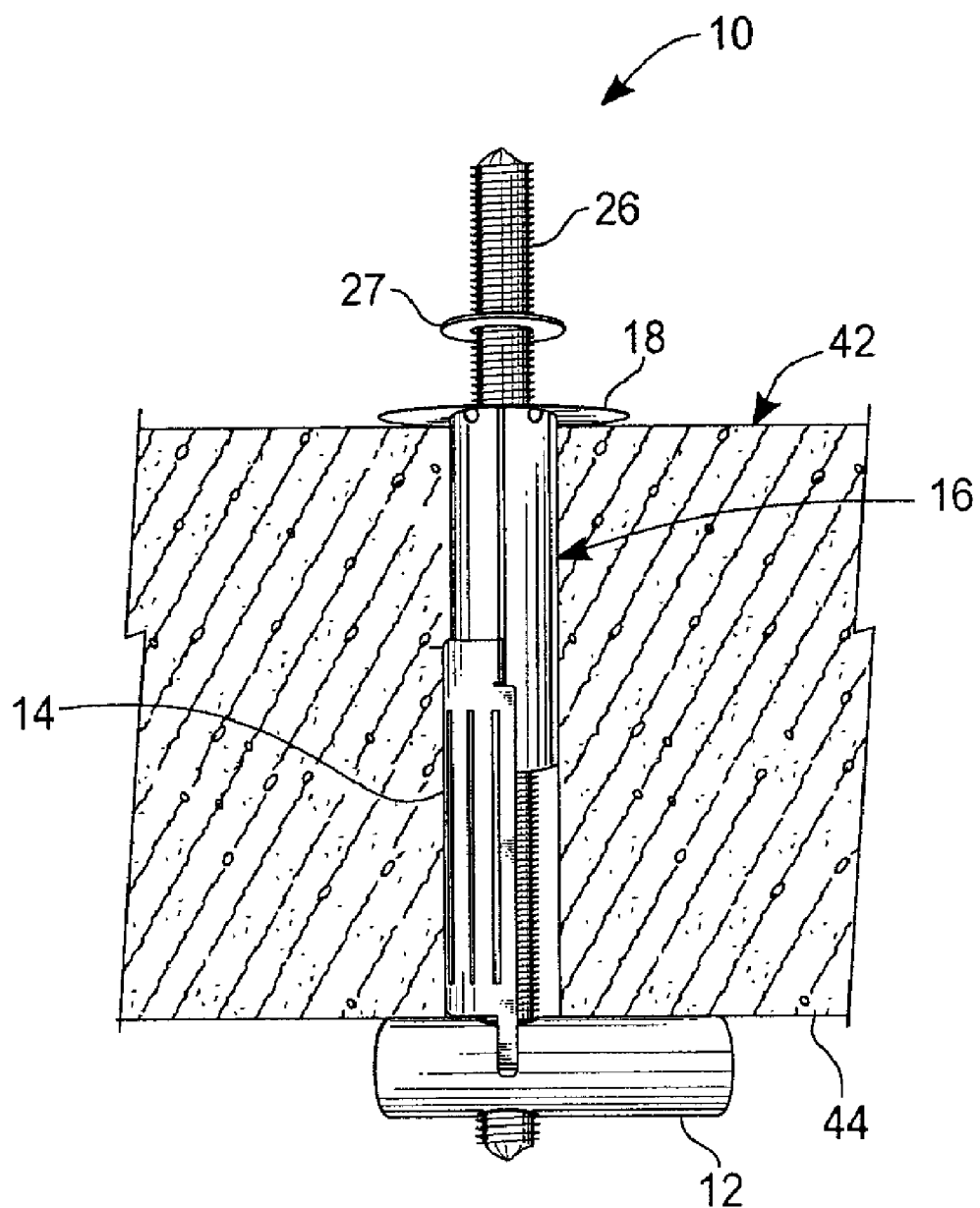
FIG. 5 is a front view of the anchor assembly of the present invention in the second position and inserted within another substrate.

With reference to FIG. 1, there is seen an anchor assembly 10 of the present invention having a nut 12 pivotable at a sleeve 14 connected to a rod housing 16. An annular flange 18 is connected to the rod housing 16 or is an integral part of the rod housing. The flange may rest upon an upper surface of the rod housing 16. The flange is connected to the rod housing by welding, for example. The flange 18 has an opening 20 (shown in FIG. 3), which is in vertical alignment with an opening 22 of the rod housing 16. The pivotable nut 12 includes a threaded opening 24 which is depicted in FIG. 1 as being in a position in vertical alignment with the opening 22 of the rod housing such that a threaded rod 26 or bolt is insertable within flange opening 20 and through the rod housing opening 22 and threadable into the nut opening 24. Threaded rod 26 is inserted within stop washer 27 (shown in FIG. 2). Stop washer 27 is attached to the rod, for example, by welding.

In the depicted example, the sleeve 14 includes two arms 28 and 30 (FIG. 2), which extend from sleeve body 15 which is, for example, one piece. In one example, the sleeve 14 may be substantially the length of the rod housing. The arms are, for example, disposed at opposed positions on the sleeve and the nut 12 is pivotable about a mount location 42 at the end of each arm. The nut 12 is pivotably attached to the sleeve 14, for example, at opposing sides of the nut and sleeve. The sleeve 14 may include slits 17 as shown in FIG. 2b. Slits may assist in preventing rotation of the sleeve. In another example, the sleeve could, for example, be two separate pieces each pivotably attached to the nut 12 and slideable along the rod housing 16.

The nut is, in one example, spring biased to a position perpendicular to the rod 26. In another example, magnets (not shown) are used to position the nut to a perpendicular position relative to the rod 26. Other mechanisms to perpendicularly position the nut may be used.

The components of the anchor assembly 10 may be any desired dimension. In one example, the pivotable nut 12 is 2 inches long and ¾ of an inch in diameter and has a threaded opening 24 that is ⅜ of an inch in diameter to receive threaded rod 26. In one example, the nut 12 is made of solid steel.

With reference to FIG. 2a, the pivotable nut 12 is vertically aligned with the rod housing 16 and the threaded rod 26, which is shown partially inserted into the rod housing opening 22. The threaded opening 24 of the nut 12 is not in vertical alignment with the flange opening 20 and the rod housing opening 22 when the nut 12 is in vertical alignment with the rod housing and the threaded rod.

With reference to FIG. 2b, the sleeve 14 is shown in a position further down than in FIG. 2a after having been moved downwardly by way of a sleeve sliding mechanism.

With reference to FIG. 3, an example of a sleeve sliding mechanism is shown. Sleeve 14 includes two projections 34, (one of which is seen in FIG. 3) each of which fits into and is slideable within a rod housing groove 32 (one of which is seen in FIG. 3). The sleeve is slideable up and down the rod housing as the projections slide up and down the grooves. Each projection is aligned with each groove. Alternative sliding mechanisms may be used, if desired. The groove 32 does not extend to the end of housing 16, thereby preventing projections 34 from sliding from the end of groove 32.

The pivotable nut, in one example, pivots at a pivot location on the end of each of the arms 28 and 30 of the sleeve 14. Pivot location 42 for arm 28 is seen in FIGS. 1 and 3.

With reference to FIGS. 4a-4c various stages of insertion of the anchor assembly 10 of the present invention are shown. FIG. 4a shows the anchor assembly pre-insertion of an opening 36 of a substrate 38. The pivotable nut 12 is in vertical alignment with the rod housing 16 and rod 26. The rod 26 is shown within the rod housing 16 but not within the nut 12.

FIG. 4b shows the anchor assembly 10 inserted within the opening of the substrate 38. After the nut 12 clears the opening 36 of the substrate 38, it rotates 90 degrees to a position perpendicular to the rod housing and rod.

In one example, the nut 12 is spring loaded causing the rotation. In its simplest form, the spring loading can be a very simple spring, such as a leaf spring, mounted within a rod housing. When the nut clears a hole, the spring provides enough force to rotate the nut into place. A rod is then secured into the nut. A spring loaded nut is shown in FIG. 6. A spring 48, affixed to the inside of rod housing 16, causes the rotation of nut 12 to a position perpendicular to the rod housing and rod. In another example, magnetic means (not shown) are used to rotate the nut. The nut opening 24 (FIG. 3) is in vertical alignment with the rod housing opening 22. This allows the rod 26 to be threaded within the rod housing opening 22 and the nut opening 24, as shown in the figure. Threading may occur by hand or other mechanisms to assist with threading may be used.

FIG. 4c shows the anchor assembly inserted within the opening 36 of the substrate 38, as in FIG. 4b, and the nut 12 drawn up closer to the rod housing 16 than in FIG. 4b. The rod 26 is further rotated to threadably engage the threads of the threaded nut opening 24. The flange 18 rests upon a substrate surface 40. The rod 26 continues through the threaded nut opening until stop washer 27 bottoms out or contacts the flange 18 on the rod housing 16. At that point, the nut 12 is drawn upwardly toward a bottom side 41 of the substrate surface 40 by way of the slideable sleeve 14. The flange 18 and the nut securely brace the substrate and provide a secure anchoring mechanism. Various equipment or apparatus may be anchored with the threaded rod. In one example, the item that is desired to be secured to the surface 38 is connected to the rod 26 and is thus secured with the assembly 10.

FIG. 5 depicts an example where a substrate 42 has a length greater than the length of the rod housing 16. In this example, the sleeve 14 is partially pushed up the rod housing 16 by way of the sliding mechanism until the point where the nut 12 contacts a bottom surface 44 of the substrate. Another advantage of the present invention is that the slideable sleeve 14 allows for the anchor assembly to be used with substrates of varying thicknesses.

Those of skill in the art will understand that various modifications could be possible. These include shapes of flanges, materials used, etc. Given that bolts and nuts are commonly sold separately, in one embodiment the device shown in FIG. 3 could be sold without a threaded rod. This would allow the user to select a rod or bolt of desired length for mounting a specific item on a roof or other structure.

What is claimed is:

1. An anchor assembly comprising:
   a threaded rod;
   a rod housing having an outer surface and a rod opening;
   a flange located at an upper surface of said rod housing, said flange having a rod opening in vertical alignment with said rod housing rod opening;
   a pivotable nut having a threaded rod opening, said pivotable nut moveable to and from a position in which said threaded rod opening of said nut is in vertical alignment with said opening of said rod housing; and
   a sleeve to which said nut is pivotably connected, said sleeve slideably mounted to said outer surface of said rod housing.

2. The anchor assembly of claim 1 wherein said pivotable nut is spring loaded.

3. The anchor assembly of claim 1 further comprising a stop washer within which said threaded rod is insertable and to which it is attachable.

4. The anchor assembly of claim 1 wherein said pivotable nut is rotatable by 90 degrees.

5. The anchor assembly of claim 1 wherein said pivotable nut is made of solid steel.

6. The anchor assembly of claim 1 wherein said sleeve includes a pair of arms pivotably connected to the nut.

7. The anchor assembly of claim 6 wherein each arm is disposed at opposed positions on the sleeve.

8. The anchor assembly of claim 1 wherein said rod housing includes at least one groove and said sleeve includes at least one projection being slideable within said groove.

9. The anchor assembly of claim 8 wherein said rod housing includes two grooves and said sleeve includes two projections, each projection slideable within a separate groove.

\* \* \* \* \*